United States Patent [19]

Kreibich et al.

[11] 4,294,227
[45] Oct. 13, 1981

[54] APPARATUS FOR HEATING WATER BY SOLAR HEAT

[75] Inventors: Ursula Kreibich, Riehen; Rolf Schmid, Gelterkinden, both of Switzerland

[73] Assignee: CIBA-GEIGY Corporation, Ardsley, N.Y.

[21] Appl. No.: 47,548

[22] Filed: Jun. 11, 1979

[30] Foreign Application Priority Data

Jun. 16, 1978 [CH] Switzerland ............ 6581/78
Aug. 29, 1978 [CH] Switzerland ............ 9114/78

[51] Int. Cl.$^3$ .............................................. F24J 3/02
[52] U.S. Cl. .................................... 126/400; 126/427; 126/435
[58] Field of Search .............. 126/400, 427, 430, 435, 126/436, 419, 421, 422; 165/104 S, 18

[56] References Cited

U.S. PATENT DOCUMENTS

| | | | |
|---|---|---|---|
| 3,931,806 | 1/1976 | Hayes | 126/400 |
| 4,040,566 | 8/1977 | Chiarelli | 237/1 A |
| 4,063,546 | 12/1977 | Schmid et al. | 126/400 |
| 4,116,222 | 9/1978 | Seifried | 126/435 |
| 4,169,554 | 10/1979 | Camp | 126/427 |
| 4,184,635 | 1/1980 | Bloomfield | 126/419 |
| 4,191,172 | 3/1980 | Walch, Jr. et al. | 126/421 |

FOREIGN PATENT DOCUMENTS

| | | | |
|---|---|---|---|
| 2730406 | 1/1978 | Fed. Rep. of Germany | 126/400 |
| 2270535 | 1/1976 | France | 126/400 |
| 2325003 | 4/1977 | France . | |
| 2365772 | 4/1978 | France . | |
| 578718 | 8/1976 | Sweden . | |

Primary Examiner—James C. Yeung
Assistant Examiner—Robert J. Marett
Attorney, Agent, or Firm—Harry Falber

[57] ABSTRACT

Apparatus comprising a solar collector, three heat exchangers operating at different temperature levels and connected in series on the service-water side, a latent-heat store, various lines and valves, a circulating pump and an electrical operation-control circuit responsive to the temperatures sensed by various temperature sensors located in the above mentioned components. The two heat-exchangers operating at the higher temperature levels are each by-passed by a mixing valve on the service-water side. Depending on the solar radiation or the temperature of the circulating medium, the heat exchangers at the higher or lower temperature level or combinations thereof are successively connected to the circulating medium.

18 Claims, 3 Drawing Figures

1

APPARATUS FOR HEATING WATER BY SOLAR HEAT

FIELD OF THE INVENTION

The invention relates to apparatus for heating water by solar energy and includes a solar collector coupled to first and second heat exchangers, one of which operates at a higher temperature than the other.

PRIOR ART

Numerous variants of devices using solar energy have been exhaustively described in a number of publications, including the article by R. Scharer in "Elektrizitatsverwertung" No. 7/8 (1974) published by Elektrowirtschaft, Zurich; in a lecture by E. Schnyder at the "Heizen mit Sonne" Conference of the Schweizerische and Deutsche Gesellschaft für Sonnenenergie dated 8/9 November 1977 at Freiburg, W. Germany, and in "Solar Energy Thermal Processes" by J. A. Duffie and W. A. Bechmann, Wiley Interscience 1974. All these devices suffer from the disadvantage that they do not make adequate use of solar energy, more particularly the less valuable part at a lower temperature.

A considerable improvement in this respect was made by the two-stage solar energy installation described e.g. in U.S. Pat. Spec. No. 4 063 546. This system comprises two substantially independent systems each having a collector, a store and a heat exchanger, one system operating at a lower temperature and the other at a higher temperature. A similar installation but without a latent-heat store is disclosed in Swiss Pat. Spec. No. 578 718. It has been shown in practice, however, that the efficiency of even the lastmentioned device can be improved.

OBJECT OF THE INVENTION

An object of the invention therefore is to provide an apparatus that can make better, more economic use of incident solar energy, or other forms of heat energy, than the prior art devices referred to above.

SUMMARY OF THE INVENTION

In accordance with this invention therefore we provide apparatus for heating water by solar energy comprising a solar collector and a first and second heat exchanger connected in series on the service-water side, the first operating at a higher temperature level than the second, wherein a third heat exchanger is provided and operates at a lower temperature level than the second heat exchanger and is connected in series with the other two exchangers on the service-water side.

The word "heat exchanger" as used herein means a device for withdrawing heat energy from a heat transfer medium, storing at least some of the energy and delivering it to a medium which is to be heated. Such heat exchangers may comprise a liquid-filled vessel and two heat exchange coils immersed in the liquid, the medium heated by solar energy flowing through one coil and service water flowing through the other coil. The liquid in the vessel acts as a storage medium and also provides a thermal connection between the two coils. In that case, the "operating temperature" of the heat exchanger is the temperature of the liquid in the vessel. In special cases the service water can itself be used as a storage medium, in which case of course one of the heat exchange coils can be omitted.

Although the aforementioned kind of heat exchanger is particularly advantageous, the storage and the heatexchange operation could of course be allocated to separate parts of the apparatus and the invention is in no way restricted to the boiler-like heat exchangers which will be described in detail.

BRIEF DESCRIPTION OF DRAWINGS

A preferred embodiment of the invention will now be described with reference to the accompanying drawings, wherein.

DETAILED DESCRIPTION OF PREFERRED EMBODIMENT

As shown in the figures, the apparatus comprises a solar collector K, three heat exchangers, A, B and C connected in series on the service-water side, a latent heat store S, a circulating pump P, 8 valves 1–8, two mixing valves MV1 and MV2 and lines or pipes (not denoted by reference numbers) connecting the aforementioned parts. The apparatus also comprises seven temperature sensors $T_K$, $T_A$, $T_B$, $T_C$, $T_S$, $T_{W1}$ and $T_{W2}$ and a control circuit ST which is actuated by the sensors and actuates the valves 1–8. The temperature sensors detect the temperature of the water flowing in collector K, the operating temperatures of the three heat exchangers A–C, the temperature of store S and the temperature of the warm water leaving the heat exchangers B and C. For simplicity, the drawings do not show the connecting line between the control circuit and the temperature sensors or valves.

The solar collector, the heat exchangers and the latent heat store are of substantially known construction. Each heat exchanger substantially comprises a container 11, 21, 31, respectively, containing a heat-transmitting medium having a high thermal capacity (e.g. water). A primary coil 12, 22, 32 and a secondary coil (13, 23, 33) respectively are immersed in the medium. The medium in the heat exchanger C may additionally be a material, e.g. paraffin which stores latent heat. The heat exchanger is also fitted with additional heating 34, such as an electric heating coil.

Figure 1:
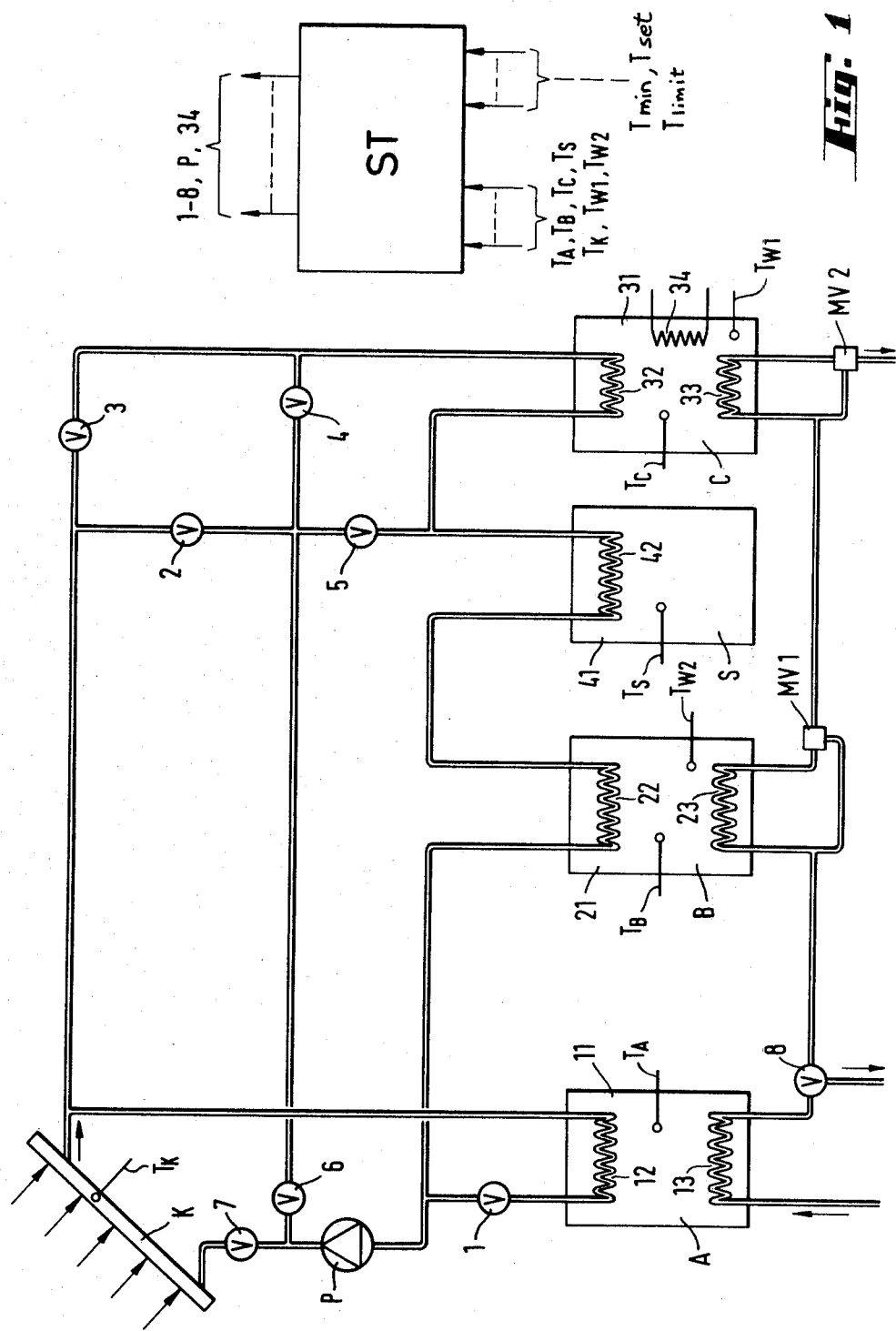
FIG. 1 is a block diagram of apparatus in accordance with this invention.
Figure 2:
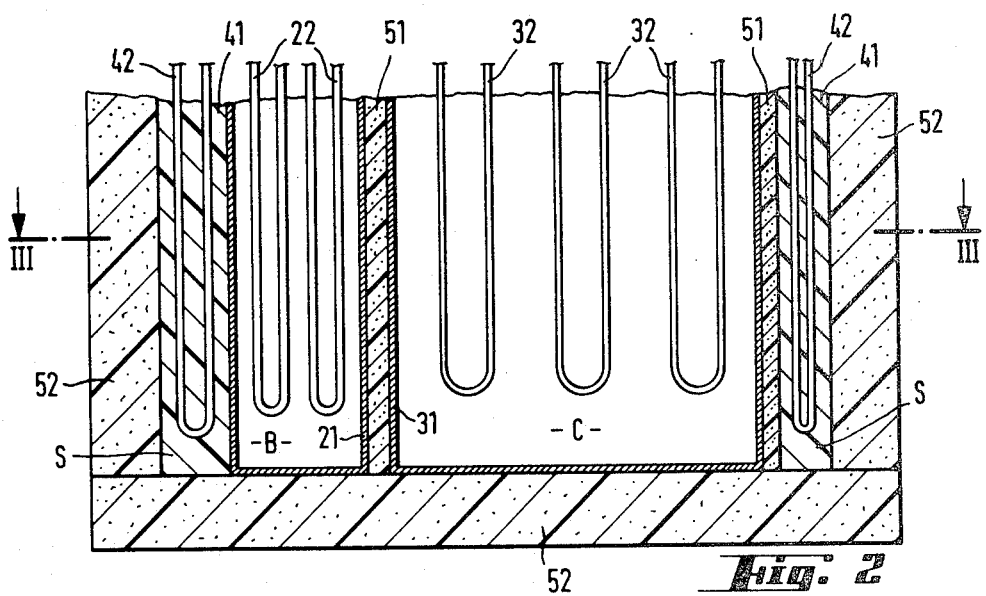
FIGS. 2 and 3 are two sections through a part of the apparatus shown in FIG. 1.
Figure 3:
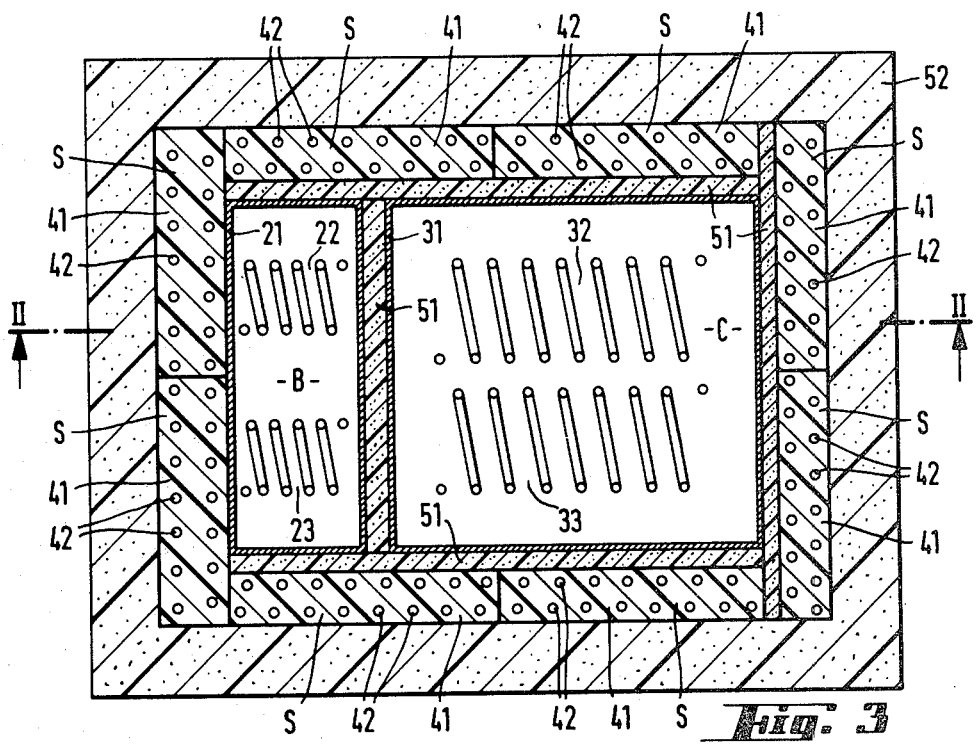

The latent heat store S substantially comprises one or more blocks 41 (FIGS. 2 and 3) of cross-linked partly crystalline plastics in which a heat exchanger coil 42 is embedded. A latent heat exchanger of the last-mentioned kind is described in detail in the above-mentioned U.S. Pat. No. 4 063 546.

Heat exchangers B and C and latent heat store S are combined into a compact structural unit. As shown by the sectional drawings in FIGS. 2 and 3, the two heat exchangers are surrounded by the plates 41 forming the latent heat store S. Heat exchanger C is also insulated by a layer 51 of soft foam. The entire block is insulated from heat losses to the exterior by an additional foam layer 52.

Blocks 41 of store S are normally provided with interconnected heat exchange elements 42, but elements 42 can be partly or completely omitted and the store can be charged by the large surface area in contact with heat exchanger B.

Heat exchanger A is a separate structural unit. It operates at the lowest temperature level and therefore does not require special insulation.

The sizes and/or volumes of the three heat exchangers A–C and the latent heat store S are approximately in the ration A:B:C:S = 1:1:2–8:2, i.e. the capacity of vessels 11, 21, 31 of heat exchangers A–C is approx. 400 and 800–3200 liter. The volume of the latent heat store, i.e. plates 41, is approx. 800 liter. These values are of course given only by way of example and can be adapted to particular requirements.

The apparatus operates as follows:

When the sun begins to shine, the water in collector K begins to warm up. As soon as the temperature $T_K$ of the water in the collector exceeds the temperature $T_A$ of heat exchanger A, the control circuit ST opens valves 1 and 7 so that the water can flow in a first charging circuit from collector K via heat exchanger A and pump P back to the collector.

As soon as the solar radiation increases and heats the water above the operating temperature $T_B$ of heat exchanger B or (depending on the method of control) as soon as the difference between the water temperature and the temperature of heat exchanger B exceeds a preset threshold, the control circuit switches over to a second charging circuit, in which valves 2, 5 and 7 are open and valves 1, 3, 4 and 6 are closed. The warm water now flows from collector K via store S, heat exchanger B and pump P back to the collector and in the process charges the store and also heats the service water flowing through the heat exchanger.

If the water temperature rises above the (preset minimum) operating temperature $T_C$ of heat exchanger C or if the temperature difference between the water and heat exchanger C exceeds a preset value, the control circuit ST switches over to another charging circuit in which valves 3 and 7 are open and valves 1, 2, 4, 5 and 6 are closed. The water then flows from the collector via heat exchanger C, store S, heat exchanger B and pump P back to the collector. In the process it transmits the thermal energy from heat exchangers B and C to the service water and simultaneously adds to the latent heat stored in S.

In normal weather, the service water, at least in exchanger C, reaches the desired set temperature $T_{set}$, i.e. approx. 55° C.=328° K. During bad weather or in winter it may be necessary to switch on the additional heating 34 in heat exchanger C. This is also done automatically via control circuit ST, which permanently monitors the temperature $T_{W1}$ in heat exchanger C via sensor $T_{W1}$.

On the service-water side, the two heat exchangers B and C are each bridged via a mixing valve MV1 and MV2 respectively. The two mixing valves are e.g. of the kind normally used in bathroom fittings. They regulate the inflow of cold and hot water so as to produce the desired temperature—e.g. approx. 55° C.—at their output. The mixing-valves ensure the lower-temperature heat exchanger is more strongly loaded and is therefore readier to receive lower-quality energy. This saves the higher-quality energy from the hotter heat exchanger, thus considerably improving the total efficiency.

In a simpler variant, not shown in the drawings, mixing valve MV1 is omitted and valve MV2 is replaced by an ordinary three-way solenoid valve actuated by the control circuit ST. In good weather, the service water may already reach the set temperature in exchanger B. If this is detected, via sensor $T_{W2}$, circuit ST switches the valve (not shown) so that the hot service water flows directly to the consumer instead of first to the heat exchanger C.

During particularly intense solar irradiation it may happen that the heat exchangers become excessively hot. To avoid this, an anti-overheating device is provided and operates as follows:

As soon as the temperature of heat exchanger C rises above a preset limiting temperature $T_{limit}$, e.g. 85° C. (=353° K.), circuit ST switches over from the third charging circuit to the second charging circuit, which does not contain heat-exchanger C. As a result, exchanger B begins to heat up. As soon as its temperature rises above a given limiting value $T_{limit}$, e.g. 80° C., circuit ST switches back to the first charging circuit, which apart from pump P contains only the heat exchanger A. If exchanger A then becomes excessively hot, the control circuit switches three-way valve 8 so that cold service water flows through exchanger A out into a sewer system symbolically indicated by the arrow at the bottom of valve 8 and thereby cools exchanger A. Thus, the protection against overheating is adequate in all cases, without using the variable energy stored at a high temperature in exchangers C and B and in store S.

If the water temperature is lower than the temperature of heat exchanger A and if the latent heat store is at least partly charged, i.e. its temperature $T_s$ is higher than a preset minimum temperature $T_{min}$, and if the store temperature is also above that of exchanger B, the control circuit switches over to a discharge circuit in which valves 5 and 6 are open and valves 1, 2, 3, 4 and 7 are closed. Accordingly, the water flows from store S via exchanger B and pump P back to store S, thus heating the service water in exchanger B and simultaneously discharging the store.

During winter or long periods of bad weather, store S can be charged in an additional circuit by the additional heating system in heat exchanger C, e.g. using cheap night electricity. To this end, circuit ST is actuated, either by hand or by a time switch, so as to open valves 4 and 6 and close valves 1, 2, 3, 5 and 7 and switch on the additional electric heating 34 in exchanger C. The water then flows from exchanger C through store S, exchanger B and pump P back to exchanger C.

The control circuit ST may have any required construction. It can be electromechanical or purely electronic; in addition to the inputs for the various temperature sensors, the outputs for the valves and the actuating means for the additional heating system, the circuit contains inputs for adjusting the set temperature $T_{set}$, the limiting temperatures $T_{limit}$ and the minimum temperatures $T_{min}$. The circuits may have any required electrical construction provided that the aforementioned operation is ensured, at least in a general sense. Of course, modifications and variants are possible within the scope of the invention. More particularly, ordinary temperature sensors can be replaced by differential thermostats.

The aforementioned apparatus, besides making maximum use of irradiated solar energy, including lower-value energy, has the advantage of relative cheapness. For example, the various circuits require only one collector and only a single circulating pump. Relatively cheap solar collectors can be used, and even the heat exchangers do not require any expensive special construction.

The lowest-temperature heat exchanger stage A can also make considerable use of the less valuable solar energy, e.g. that which is present even in cloudy weather.

The higher-temperature heat exchanger or exchangers can be by-passed so that the service water is heated only to the desired minimum temperature. This reduces the consumption of relatively valuable, higher temperature energy and also reduces the temperature of the lowest-level heat exchanger, so that it can use the less valuable energy more efficiently. As a result, in the three-stage system described, exchanger A is more often ready to store diffuse heat which can then be used for pre-heating cold service water. The lower temperatures of the exchanger B and particularly of exchanger A result in low circuit temperatures and thus considerably improve the efficiency of the collector and thus of the entire system. It is also possible to use lower-quality waste heat, more particularly in the stage A.

The construction of the heat exchangers and store from plate-shaped elements is particularly advantageous. It ensures good thermal exchange and the heat transfer medium which need not necessarily be water, is not under pressure and need not be renewed and can thus be protected against corrosion as required.

The preceding description relates to a three-stage apparatus comprising a latent heat store. The latent heat store can be omitted in less demanding applications or at places with above-average solar radiation, in which case the installation can be simplified by omitting some valves.

The apparatus according to the invention need not be used only for solar energy, but can also use waste heat or the like, e.g. for space heating, water heating, or commercial or agricultural drying installations. The apparatus can also be used in combination with air-conditioning plants, cooling units or the like.

What we claim is:

1. Apparatus for heating water by solar energy, comprising a solar collector, a latent-heat storage means, first and second heat exchangers, and a service-water outlet side, the first exchanger operating at a lower temperature than the second, each of said heat exchangers comprising a container having a first heat exchange material therein, a first conduit passing through said container for conveying a second heat exchange material in indirect heat exchange with said first heat exchange material and a second conduit passing through said container conveying a third heat exchange material in indirect heat exchange with said first heat exchange material, storage means the second conduit of each heat exchanger being connected in series on the service water outlet side, means coupling the heat exchangers to the and collector to form three circuits, the first containing the collector and the first heat exchanger, the second containing the collector, the storage means and the second heat exchanger, and the third containing the storage means and the second heat exchanger, a circulating means in each circuit, and a plurality of sensors to sense the temperature of the circulating medium in the collector, the operating temperatures of the two heat exchangers and the temperature of the storage means, and a control circuit responsive to said sensors to, activiate the first circuit if the collector temperature is higher than the operating temperature of the first heat exchanger and lower than that of the second heat exchanger, activate the second circuit if the collector temperature is higher than the operating temperature of the second heat exchanger, and activate the third circuit if the collector temperature is lower than the operating temperature of the first heat exchanger and if the temperature of the storage means is simultaneously higher than the operating temperature of the second heat exchanger.

2. Apparatus according to claim 1, including, a third heat exchanger defined as said first and second heat exchangers in claim 1 with the second conduit thereof connected in series on the service-water outlet side with said second conduits of the other two heat exchangers, said third exchanger operating at a higher temperature level than the second heat exchanger, the third heat-exchanger being connected to the second heat exchanger, the storage means and the collector to form a fourth circuit, and an additional sensor to sense the operating temperature of the third heat exchanger;

wherein the control circuit activates the fourth circuit if the collector temperature is higher than the operating temperature of the third heat exchanger as sensed by the additional sensor.

3. Apparatus as claimed in claim 2, wherein said circulating means comprises a pump common to all said circuits.

4. Apparatus for heating water by solar energy, comprising solar collector; a first heat exchanger; a second heat exchanger; a third heat exchanger; and a service water outlet side; the first exchanger operating at a higher temperature level than the second exchanger, the third heat exchanger operating at a lower temperature level than the second heat exchanger, each of said heat exchangers comprising a container having a first heat exchange material therein, a first conduit passing through said container for conveying a second heat exchange material in indirect heat exchange with said first heat exchange material and a second conduit passing through said container conveying a third heat exchange material in indirect heat exchange with said first heat exchange material, the second conduit of each heat exchanger being connected in series on the service-water outlet side; and means selectively coupling said first conduit of each heat exchanger to said solar collector.

5. Apparatus according to claim 1, including a latent heat storage means and means for detecting the temperature of the solar collector, said selectively coupling means also including means for connecting said heat storage means to one or more of the heat exchangers in dependence on the temperature of the solar collector.

6. Apparatus according to claim 3, wherein said selectively coupling means includes a plurality of valves coupling said heat exchangers, the storage means and the collector to form four circuits, the first containing the collector and the third heat exchanger, the second containing the collector, the storage means and the second heat exchanger, the third containing the storage means and the second heat exchanger and the fourth containing the collector, the first heat exchanger, the storage means and the second heat exchanger; wherein said apparatus further includes circulating means for each circuit, a plurality of sensors for the temperature of the circulating medium in the collector, the operating temperatures of the three heat exchangers and the temperature of the storage means, and a control circuit responsive to said sensors to,
- activate the first circuit if the collector temperature is higher than the operating temperature of the third heat exchanger and lower than that of the second heat exchanger,
- activate the second circuit if the collector temperature is higher than the operating temperature of the second heat exchanger,
- activate the third circuit if the collector temperature is lower than the operating temperature of the third heat exchanger and if the temperature of the storage means is simultaneously higher than the operating temperature of the second heat exchanger, and
- activate the fourth circuit if the collector temperature is higher than the operating temperature of the first heat exchanger.

7. Apparatus according to claim 6, wherein the control circuit is operable to switch over from the fourth to the second circuit and from the second to the first circuit when the operating temperature of the first or second heat exchanger rises above a limiting value as sensed by said sensors.

8. Apparatus according to claim 7, wherein the control circuit is operable to cause cold service water to pass through the third exchanger if its operating temperature rises above a limiting value as sensed by the sensor associated with said third heat exchanger.

9. Apparatus according to claim 6, wherein the first heat exchanger is equipped with heating means and is connected to the latent-heat storage means and the second heat exchanger and the circulating means forms a fifth circuit operable by the control circuit.

10. Apparatus according to claim 6, including an additional temperature sensor, an outlet for heated service water connectable by the control circuit to the service-water outlet of the second or first heat exchanger, depending on whether the service-water temperature at the outlet of the second heat exchanger is above or below a given set temperature sensed by said additional sensor.

11. Apparatus according to claim 1, wherein the third heat exchanger is a separate unit and the first and second heat exchangers are an integral unit.

12. Apparatus according to claim 1, including a mixing valve to by-pass the service-water outlet side of the first heat exchanger.

13. Apparatus according to claim 12, including a second mixing valve to by-pass the service-water outlet side of the second heat exchanger.

14. Apparatus according to claim 1 wherein the first heat exchange material in the first heat exchanger includes a latent heat-storing medium.

15. Apparatus according to claim 5, wherein the third heat exchanger is a separate unit and the first and second heat exchangers are an integral unit.

16. Apparatus according to claim 15, wherein the first and second heat exchangers are at least partly directly surrounded by the heat storage means.

17. Apparatus according to claim 16, wherein the storage means contains a partly crystalline cross-linked plastics which acts as the heat-storing medium.

18. Apparatus according to claim 17, wherein the storage means is formed by block-like elements.

* * * * *

UNITED STATES PATENT AND TRADEMARK OFFICE
CERTIFICATE OF CORRECTION

PATENT NO. : 4,294,227
DATED : OCTOBER 13, 1981
INVENTOR(S) : URSULA KREIBICH ET AL

It is certified that error appears in the above—identified patent and that said Letters Patent is hereby corrected as shown below:

Claim 1, Column 5, line 54 reads:

"to the and collector to form three circuits, the first"

Should read:

-- to the storage means and collector to form three circuits, the first --

Signed and Sealed this

Thirtieth Day of March 1982

|SEAL|

Attest:

Attesting Officer

GERALD J. MOSSINGHOFF
Commissioner of Patents and Trademarks